United States Patent
Kewitsch

(10) Patent No.: US 7,665,901 B2
(45) Date of Patent: Feb. 23, 2010

(54) PROTECTIVE FIBER OPTIC UNION ADAPTERS

(75) Inventor: Anthony Stephen Kewitsch, Santa Monica, CA (US)

(73) Assignee: Telescent Inc., Santa Monica, CA (US)

( * ) Notice: Subject to any disclaimer, the term of this patent is extended or adjusted under 35 U.S.C. 154(b) by 0 days.

(21) Appl. No.: 11/865,731

(22) Filed: Oct. 2, 2007

(65) Prior Publication Data

US 2008/0019642 A1     Jan. 24, 2008

Related U.S. Application Data

(63) Continuation-in-part of application No. 11/307,688, filed on Feb. 17, 2006, now abandoned.

(51) Int. Cl.
    *G02B 6/38*     (2006.01)
(52) U.S. Cl. .............. 385/73; 385/55; 385/56; 385/58; 385/60; 385/62; 385/66; 385/67; 385/72; 385/75; 385/70
(58) Field of Classification Search ........... 385/73, 385/55, 56, 58, 60, 62, 66, 67, 70, 72, 75
See application file for complete search history.

(56) References Cited

U.S. PATENT DOCUMENTS

| | | | | |
|---|---|---|---|---|
| 4,212,514 A | * | 7/1980 | Prunier et al. ................. | 385/73 |
| 4,893,889 A | * | 1/1990 | Iwakiri et al. ................. | 385/39 |
| 5,136,681 A | * | 8/1992 | Takahashi ................... | 385/140 |
| 5,267,342 A | * | 11/1993 | Takahashi et al. ........... | 385/140 |
| 5,317,663 A | * | 5/1994 | Beard et al. ................... | 385/70 |
| 5,737,463 A | * | 4/1998 | Weiss et al. ................... | 385/59 |
| 5,906,686 A | * | 5/1999 | McNeil ......................... | 134/1 |
| 6,142,677 A | * | 11/2000 | Sato et al. ..................... | 385/72 |
| 6,341,191 B1 | * | 1/2002 | Takahashi ................... | 385/140 |
| 6,712,523 B2 | * | 3/2004 | Zimmel ........................ | 385/72 |
| 6,807,358 B2 | * | 10/2004 | Jones et al. ................. | 385/140 |
| 6,840,684 B2 | * | 1/2005 | Melchior et al. ............. | 385/66 |
| 2002/0181888 A1 | * | 12/2002 | Zimmel ........................ | 385/72 |
| 2003/0031423 A1 | | 2/2003 | Zimmel | |
| 2004/0258363 A1 | * | 12/2004 | Shigihara et al. ............. | 385/73 |

* cited by examiner

*Primary Examiner*—Frank G Font
*Assistant Examiner*—Ryan Lepisto
(74) *Attorney, Agent, or Firm*—Raymond Bogucki

(57) ABSTRACT

Devices to enhance the reliability of optical networks and to reduce the cost of repair are disclosed in this invention. In particular, compact and inexpensive fiber optic union adapters with built-in protective isolation prevent the transfer of damage from one connectorized fiber optic cable to another. The fiber optic union includes a split sleeve with an interior channel and a fiber stub centrally located within the interior channel. The fiber stub makes direct optical contact with the cable endfaces to enable efficient optical transmission between interconnected cables while providing a low loss, low back reflection adiabatic transition between the waveguide cores of the two cables.

5 Claims, 14 Drawing Sheets

PROTECTIVE FIBER OPTIC UNION ADAPTERS

REFERENCE TO RELATED APPLICATIONS

This application is a continuation-in-part of U.S. patent application Ser. No. 11/307,688, filed on Feb. 17, 2006 and entitled "Isolated Fiber Optic Union Adapters".

FIELD OF THE INVENTION

This invention relates to optical systems using fiber optic cables to transmit illumination and/or signals, and more particularly, to devices enabling low insertion loss and low back reflection connections between fiber optic cables while also preventing the propagation of connector end face damage between cables.

BACKGROUND OF THE INVENTION

Fiber optic cables are terminated with polished connectors that interchangeably interconnect with low optical insertion loss to other patchcords or fiber optic devices having compatible connectors. These connectors include an optical fiber, one end of which is stripped to expose the bare glass and bonded within a precision, close tolerance hole of a ferrule. The fiber and ferrule end faces are made co-planar and optically smooth by cleaving or subsequent polishing of the end face. In the common male-type fiber optic termination, a length of polished ferrule containing the optical fiber extends outside of the connector housing.

Male-type connectorized fibers may be interconnected to one another with low optical loss (<0.25 dB) in transmission by inserting the connectors into opposite ends of a fiber optic union adapter. Union adapters typically consist of a housing with opposing receptacles that surround a hollow, precision split sleeve whose nominal inner diameter is slightly less than the outer diameter of connectors' ferrules. The mating of the ferrules within the union adapter elastically deforms the semi-tubular wall of the split sleeve to slightly enlarge the inner diameter of the sleeve. The sleeve produces an opposing compressive force on the ferrules which aligns the ferrules concentrically. Precision manufacturing ensures that the optical fiber core is concentric with the optical fiber outer diameter, and the hole within the ferrule is concentric with the ferrule outer diameter at one end of the ferrule. Consequently, the two fiber cores are repeatedly aligned concentrically to micron or sub-micron tolerances. A slight axial force on the ferrules is produced once the spring-loaded bodies of the connector assemblies are attached to the housing of the union adapter, ensuring that the domed, polished end faces of the fiber/ferrule assemblies of the two different cables are mechanically and optically contacted within the split sleeve.

The polished ferrule contact areas are highly susceptible to scratching caused by repeated mating and demating cycles in the presence of contaminants trapped on or in the vicinity of the contact area. Surface damage to the fiber endface in the vicinity of the optical fiber's core degrades optical performance. In particular, the increased excess loss and reduced return loss can seriously compromise the network's performance. With broadcast-type access networks, in which the optical signal is power split between as many as thirty-two users, the optical power budget of the network has low margin and the impact of such damage is particularly significant. This problem is exacerbated by the fact that a single contaminated or damaged fiber/ferrule, if connected to other clean and undamaged fiber terminations, can degrade these other fiber terminations and propagate connector damage throughout the network.

In the past, the primary users of fiber optic telecommunications equipment have been service providers such as telephony and cable operators delivering data, video and telephone transmission. Their optical networking equipment has historically been centrally located within specialized facilities maintained and operated by highly experienced engineers. A growth in applications of fiber optic technology is occurring as fiber is increasingly being deployed in local area networks (LANs) located in the end users' facilities. In this decentralized architecture, the cost to diagnose and repair damaged terminations increases considerably depending on the physical location of the termination within the network. For instance, damage to an inaccessible connectorized drop cable originating from within a customer's wall or damage at the connector interface of a populated, high-density fiber patch panel requires a costly service call and repair by an experienced technician. These are two examples of "backside" fiber optic terminations which are difficult to repair by virtue of their inaccessibility.

Fiber optic access networks may incorporate large numbers of reconfigurable connection interfaces as the fibers branch out from a central closet to each access location. For instance, fiber optic patch cables attach at one end to connectors at wall or desk mount interface plate and at the other end to fiber optic modems or gigabit Ethernet transceivers. Typically, the ends of the fiber optic drop cable within the customer's premises are terminated using highly specialized and costly fiber optic termination equipment. Once the fiber build-out is complete, proper handling of the fiber cable and connectors must be diligently maintained to preserve the performance of the network. Fiber optic cable is particularly susceptible to cracking due to excessive bends and polished fiber optic terminations are susceptible to scratching if contacted with dirty and contaminated connectors. Repair and debugging requires skilled fiber optic technicians, adding significant cost and overhead to maintain the network. As a consequence, present day fiber optic systems lack the robustness commonly found in electronic networking systems.

Recent advances in the design of union adapters for various standard connector styles (FC, SC, ST, LC, MTRJ) have focused on approaches to prevent contamination from entering the critical split sleeve area. This includes the development of various shields and covers to help prevent contamination from entering the front side union adaptor body. U.S. Pat. No. 5,887,098 by Ernst et al. discloses an FC-type fiber optic union adapter with a two-part shield assembly to cover the end of the receptacle when a cable is not attached. U.S. Pat. No. 6,863,445 by Ngo describes an alternate cap design for SC type fiber optic union adapters. However, these approaches do not prevent a damaged or contaminated connector ferrule from damaging the mating connector.

In addition, an alternate type of fiber optic adapter is designed to produce substantial signal attenuation by introducing an air gap or misalignment between opposing connector ferrules or by inserting a lossy optical element between the mating ferrules are available. For example, U.S. Patent Application 2003/031423 by Zimmel describes an SC-type fiber optic adapter that includes a sheet of attenuator glass embedded at the longitudinal center of the alignment split sleeve and U.S. Pat. No. 5,267,342 by Takahashi et al. introduces an air gap between connector ferrules to cause light to escape from the central waveguide. This adapter produces significant insertion loss (>=5 dB) since it is designed to produce attenuation. These attenuators interrupt the longitudinal continuity of the central waveguide cores attached to either side of the attenuator housing and thereby introduce a significant amount of loss and optical backreflection. These devices rely on a non-adiabatic or abrupt discontinuity in the waveguide core as is passes through the attenuating adapter.

A low loss, low backreflection, low cost and compact device to prevent polished surface damage (PSD) from propagating to other fiber optic connectors and fiber optic devices is therefore of particular importance, much like its analog, the electrical fuse, which is also a sacrificial element protecting costly electronic systems from damage and which can be inexpensively and easily replaced.

SUMMARY OF THE INVENTION

This invention discloses compact, protective, and sacrificial fiber optic union adapters incorporating an internal adiabatic waveguide core transition section to reconfigurably interconnect two fiber optic cables with low insertion loss and low back reflection. The deployment of these union adapters within fiber optic networking systems reduces the potential for damage to "back-side", or partially inaccessible fiber optic cable spans, thereby minimizing networking downtime and reducing maintenance costs. These adapters include a miniature internal fiber stub element within a precision alignment sleeve to prevent direct physical contact between the polished end faces of connectorized fibers, while providing highly efficient optical coupling between the two mating fiber optic cables through an adiabatic waveguide core transition. The term "adiabatic" refers to the slow variation of waveguide core optical propagation characteristics across the mating fiber interface. The slow variation ensures that the optical signal is not coupled into other forward, backward, or scattering optical modes, all of which contribute to optical loss downstream of the union adapter and backreflections upstream of the union adapter. The internal fiber stub element comprises length(s) of single mode or multi-mode fiber(s) bonded within a precision ferrule and precisely polished on opposite end faces. The optical fiber and polished end face characteristics are selected to be nominally identical to the connectorized fibers attached thereto.

DETAILED DESCRIPTION OF THE INVENTION

Figure 1A:
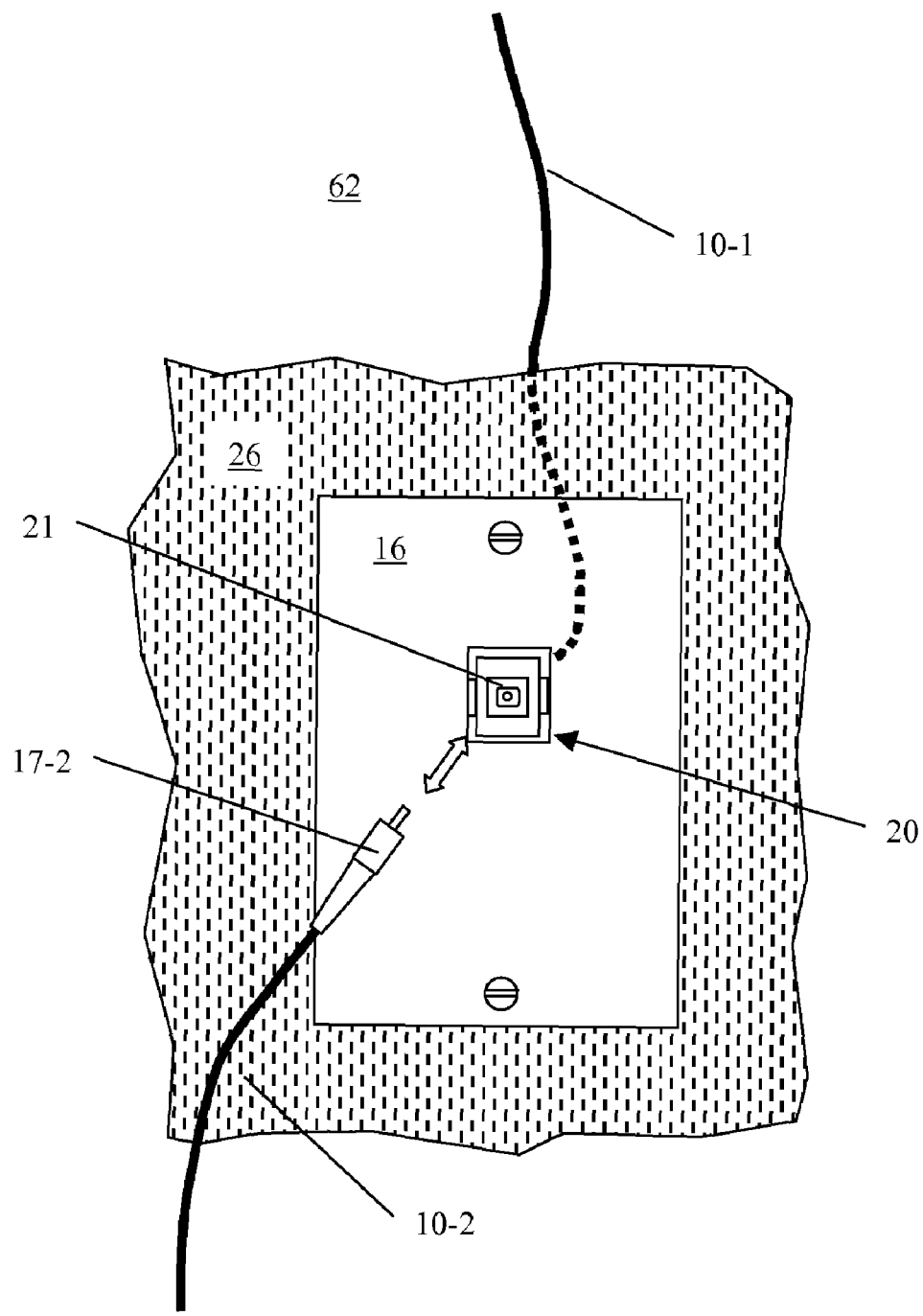
FIG. 1 illustrates a front view (A) and a side cutaway view (B) of an isolated fiber optic union adapter attached to a wall mounted interface plate.
Figure 1B:
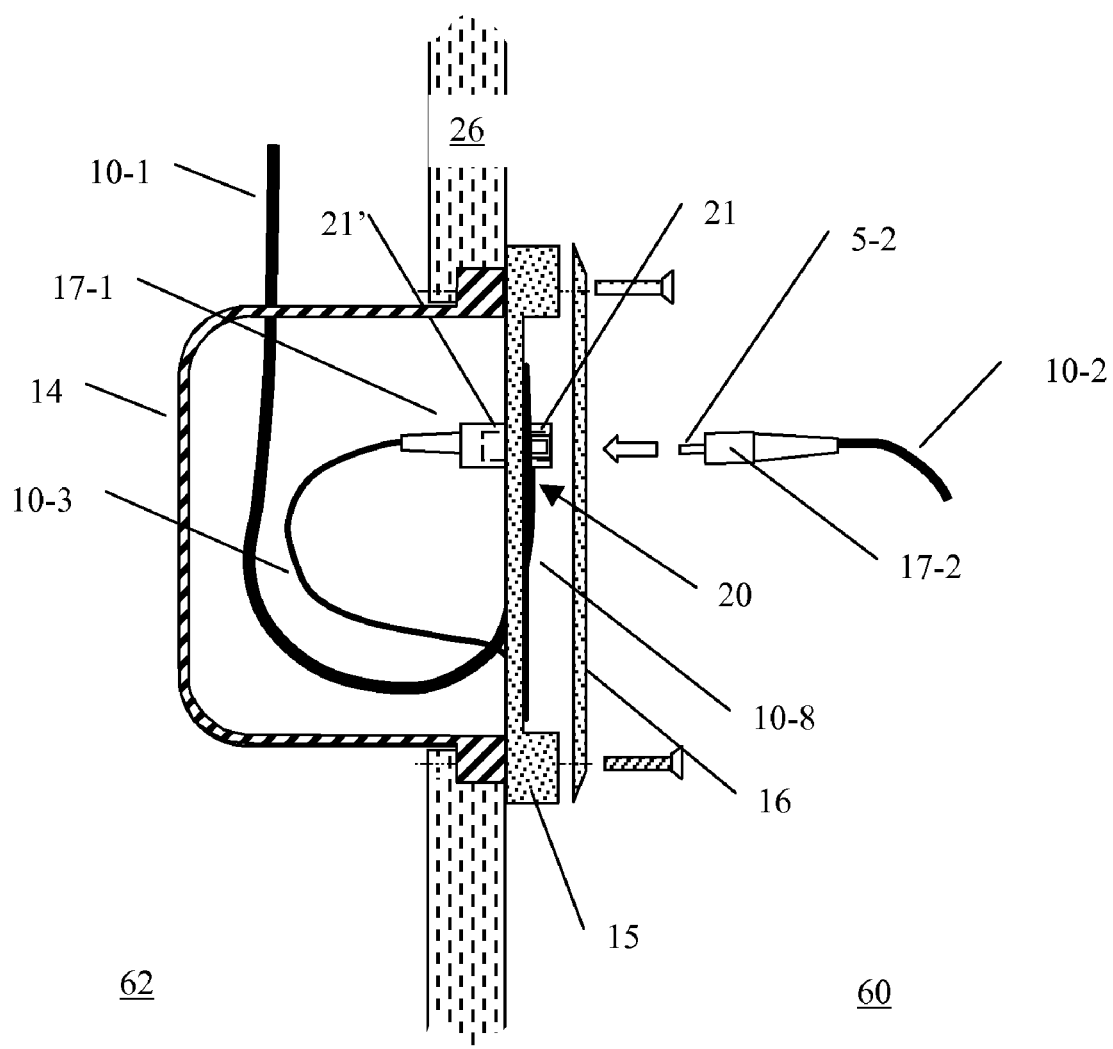

In accordance with the invention, FIG. 1A illustrates a front view and FIG. 1B a side cutaway view of a low loss, low backreflection, compact and protective fiber optic union adapter 20 mounted behind a wall cover plate 16 attached to an interior wall 26 of an office or home, for example. The connectorized end 17-2 of a front-side fiber optic patchcord 10-2 is inserted into the front receptacle 21 of union adapter 20 to optically interconnect this patchcord 10-2 to a back-side fiber optic drop cable 10-1 originating from an inaccessible or difficult to access area 62 behind wall 26. The front-side cable lies within an accessible field 60 and can be easily replaced and removed. The back-side terminated and connectorized end 17-1 of fiber 10-1 is inserted into the back receptacle 21' of union adapter 20. During installation of the fiber optic cabling, the end of the back side drop cable 10-1 is terminated with the polished connector 17-1. This polished connector is produced either by an on-site cleaving and/or polishing process or by fusion splicing a polished, pre-manufactured connector pigtail to the drop cable 10-1. The cleaving, polishing and fusion splicing processes each require considerable skill and costly equipment to perform. Therefore, the subsequent protection of back-side connector 17-1 from polished surface damage (PSD) during routine plugging and unplugging of fiber optic connectors into receptacle 21 over the service life of the network is of significant value.

Figure 2:
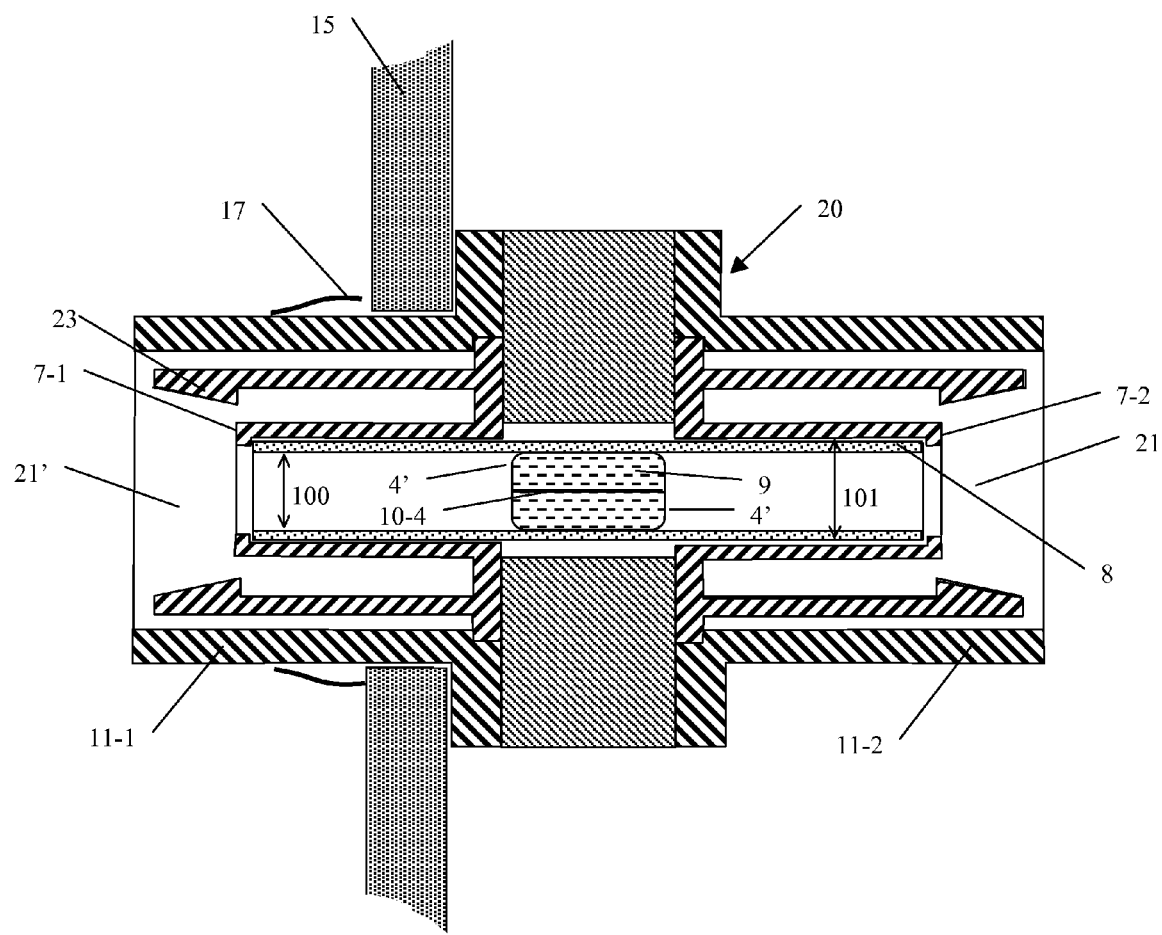
FIG. 2 illustrates a cross sectional view of an SC-UPC type isolated fiber optic union for joining two male connector ends, including the adiabatic waveguide core transition.

Such PSD protection is provided by the union adapter of the present invention by preventing direct physical contact between the front side and back side cables. FIG. 2 details in cross section an SC simplex bulkhead type isolated union adapter with fiber stub 9 including a length of single mode (e.g., SMF-28e fiber from Corning Inc.) or multimode (e.g., 50/125 micron Infinicor from Corning Inc.) fiber 10-4 along the longitudinal axis with ultra-physical polish (UPC) endfaces 4'. The endfaces have a slight radius of curvature (dome) to provide physical contact. The "V number" (see Snyder and Love, Optical Waveguide Theory, 1995 Chapman and Hall, Sections 18-5 and 19-2) at either end of fiber 10-4 are selected to be nominally identical to the V numbers of mating fiber optic cables 10-1 and 10-2 to provide a low loss, low backreflection adiabatic waveguide interface.

The angles and curvatures of the polished surfaces 4' are provided in accordance with the standards developed for PC (physical contact), UPC (ultra-physical contact) or APC (angled physical contact) type fiber optic connectors. The surfaces 4' typically have a large radius of curvature (~20 mm) to produce a slight "dome" on the end face. On the scale of FIG. 2, this radius is sufficiently large that the dome is not apparent. The end faces typically have a slight circumferential bevel that extends in about 100 to 300 microns radially from the outer diameter of the stub to guide the connector ferrule into the union adapter split sleeve during cable mating. Within housing 11-1, 11-2 lies the precision split sleeve 8 loosely constrained longitudinally and radially by a transversely divided outer sleeve 7-1 and 7-2 with inner diameter 101. The fiber stub 9, with outer diameter 100, including embedded fiber 10-4, is epoxied or compression fit within split sleeve 8. While FIG. 2 depicts a union adapter for simplex SC type connectors, this approach is scaleable to duplex or multi-fiber type connectors.

FIG. 2 illustrates the protective union adapter wherein an internal, adiabatic waveguide core transition achieves low optical loss and back reflection when interconnecting cables. If a patchcord 10-2 with connector 17-2 containing a damaged or dirty ferrule tipped terminal 5-2 is inserted into the front receptacle 21 of union adapter 20, the replaceable, isolated union adapter 20, the non-absorbing, adiabatic fiber stub 9 would prevent the transfer of damage to the polished ferrule tip of back-side termination connector 17-1. Damage to the union adapter 20 is a less costly problem than damage to the back-side termination. Drawing an analogy to electrical systems, it is preferable to replace an electrical fuse rather than the piece of equipment it was designed to protect. Therefore, the protective union adapter disclosed here is a sacrificial element designed to be sufficiently low cost, so that it can be replaced by a simple, inexpensive procedure. Removal and replacement of isolated union adapter 20 is also facilitated by use of a clip mechanism 17 or screws to attach to interface plate 15, for example. The restoration of network functionality simply requires that front-side cable 10-2 and fiber stub 9 of isolated union adapter 20 be replaced in a simple exchange of relatively inexpensive components. This avoids a costly on-site visit by a repair technician.

The unique advantages of the union adapter disclosed herein are achieved by transmitting the optical signal between cables through an intermediately positioned, low loss fiber stub that provides longitudinally uninterrupted, optically continuous, adiabatic optical signal exchange between the waveguide cores of the front-side and back-side cables. The fiber stub includes a central optical waveguide core, substantially matched in geometry and optically contacted to opposite ends to the waveguide cores of the mating cables. Light propagates adiabatically from one cable to the other cable through a fiber waveguide intermediary, while longitudinal perturbations to the effective modal indices of refraction are kept small such that little or no energy is coupled into lossy modes. Furthermore, the optical waveguide effective modal indices of refraction at either end of the stub are matched to those indices of the mating cables.

The split sleeve is typically fabricated of ceramic, plastic or phosphor bronze and the housing 11 is typically fabricated of injection molded plastic. An exploded view of this protective union adapter is illustrated in FIG. 3, comprising the stub 9 which is press fit into sleeve 8, this assembly floating within the cavity formed by outer sleeves 7-1 and 7-2, which are retained within housing shells 11-1 and 11-2 which are adhesively or ultrasonically bonded.

Figure 3:
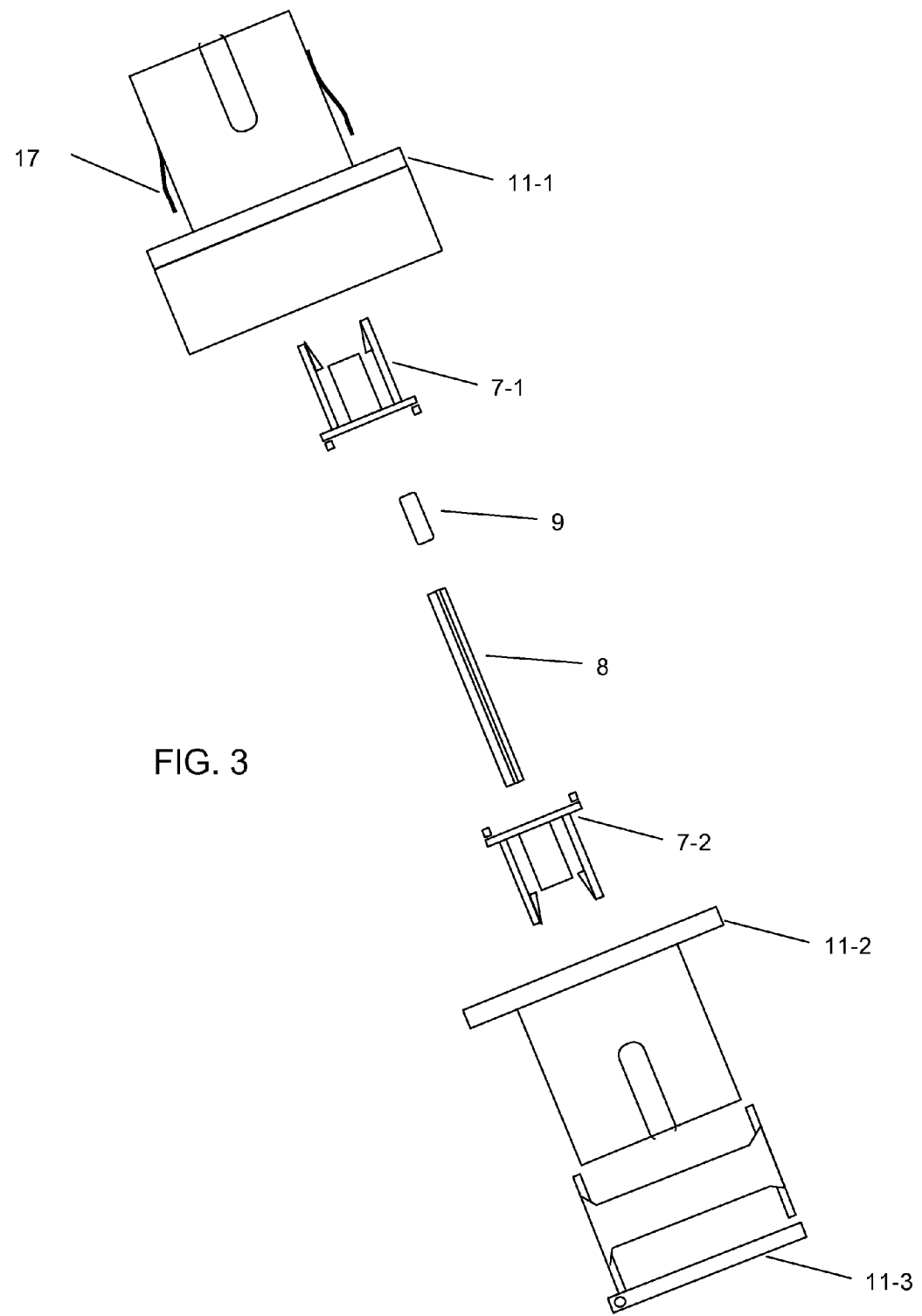
FIG. 3 illustrates an exploded view of an SC-UPC type isolated fiber optic union for joining two male connector ends.

FIG. 3 also depicts an external, spring loaded shutter feature 11-3. In general, an external or internal beam shutter may be added to the union adapter and consists of a spring-loaded plastic or metallic element which physically blocks the light escaping when a cable transmitting an optical signal is inserted into the backside union adapter receptacle 21'. That element 11-3 is, for example, a miniature rectangular door with a pivot or hinge on one edge and attached to the union adapter receptacle housing 11-2. The shutter enhances eye safety by preventing stray light from disconnected fiber optic cables and equipment from being focused to high intensity within the eye. This shuttered union adapter can additionally include an integrated electronic micro-switch whose electrical state changes should the shutter be open or closed while the fiber optic connection is un-terminated. For example, the laser source input into the fiber at some local or downstream location can be turned off if the union adapter is un-terminated and the shutter is open. This can be particularly relevant for photonic power delivery systems, in which optical fiber is used to transmit relatively high optical powers for conversion into electricity by a photoconductive conversion method at some remote location.

The union adapter of the present invention may further include an integrated photodetector (e.g., silicon, GaAs or InGaAs) that generates sufficient power to turn on a visible wavelength light emitting diode incorporated into the housing of the union adapter. While typical optical power levels in communications applications are 1 mW, they can exceed 1000 W for high power fiber optic beam delivery systems.

Optically polished fiber end faces must interface with low loss and backreflection even after substantial numbers of mating and de-mating cycles. Since the optical fibers are typically fabricated of silica or Germanium doped silica glass, the hardnesses of these mating surfaces are substantially identical. A drawback of this construction is that excessive surface roughness on one fiber end face can transfer damage on the mating surface and such connections have a tendency to degrade. The wear-out problem is mitigated by interfacing the two cables through a longitudinally intermediate fiber stub element, whereby at least the surface of the fiber stub 9 waveguide end faces 4, 4' contacting the front-side cable 10-2 is of a material or coated with a material which is of substantially higher material hardness than that of the mating surface material of the front-side cable. This feature further increases the service lifetime of the protective union adapter 20.

In particular, the fiber stub material may be silica while the front side and back side optical fibers are constructed of a highly transmissive plastic such as methyl-methacrylate. Since silica exhibits substantially higher material hardness than plastic, the protective stub will be immune to damage from the surface imperfections of the plastic optical fiber end face. Additionally, to interconnect glass optical fibers, a silica glass fiber stub is utilized, wherein additional polished surface protection is provided by coating one or both stub 9 end faces 4 or 4' with a ¼ wave thick layer of hard thin film (e.g., diamond). The ¼ wave thickness is adequate for protection while also serving as an antireflection coating to minimize back reflections and excess optical loss. Hard, durable coatings may be applied after polishing to the end of the fiber stub 9 by evaporation or sputtering, for example, and typically utilize a relatively low temperature process (<120 C) to prevent degradation of the epoxy used to bond the optical fiber core within the fiber stub ferrule. This use of dissimilar hardnesses is similar to mechanical techniques to prevent galling between metal contact points.

In an additional example, reflective thin film coatings on the fiber stub 9 endfaces produce optical reflections from the back and/or front side fiber stub surfaces. The coatings may exhibit either a narrow-band or broad-band wavelength response and are typically multilayer dielectric coatings produced by evaporation or sputtering. Alternately, the fiber stub may include a fiber Bragg grating element recorded within the optical fiber segment, providing a narrow band reflection spectrum. Such a protective union adapter introduces wavelength dependent optical filitering into the fiber optic transmission path and finds application to wavelength division multiplexed (WDM) communication and sensor systems.

Figure 4A:
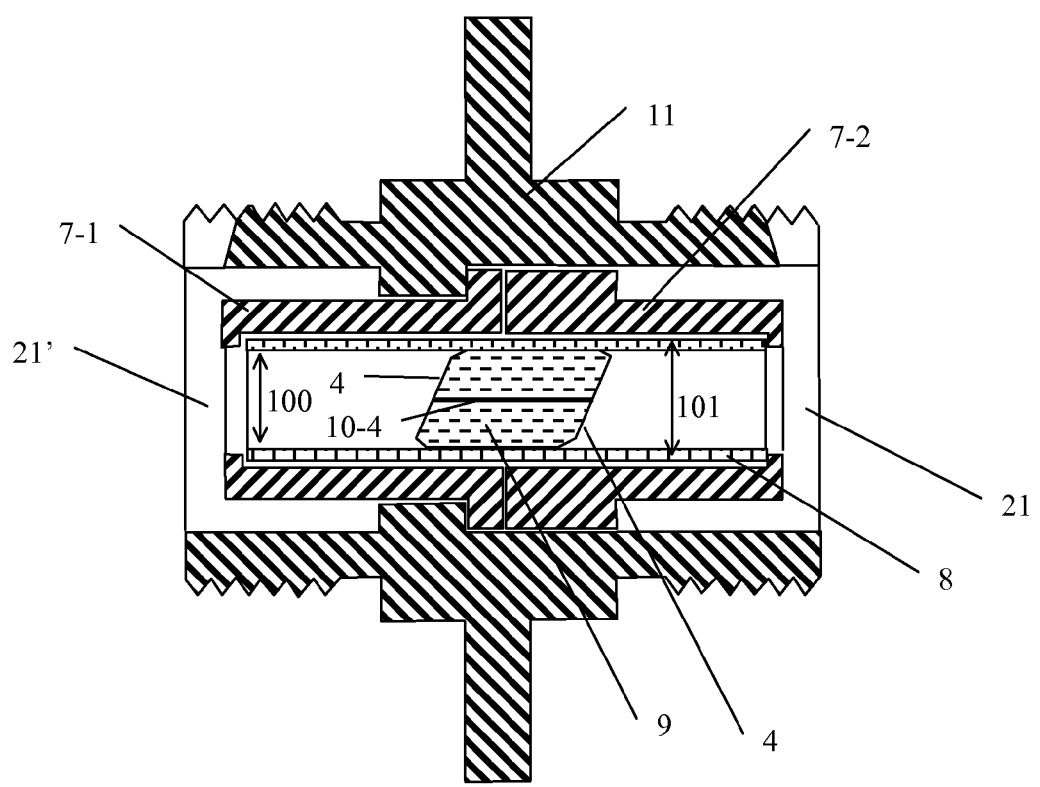
FIG. 4 illustrates a cross sectional view (A) and front view (B) of an FC-APC type isolated fiber optic union for joining two male connector ends.
Figure 4B:
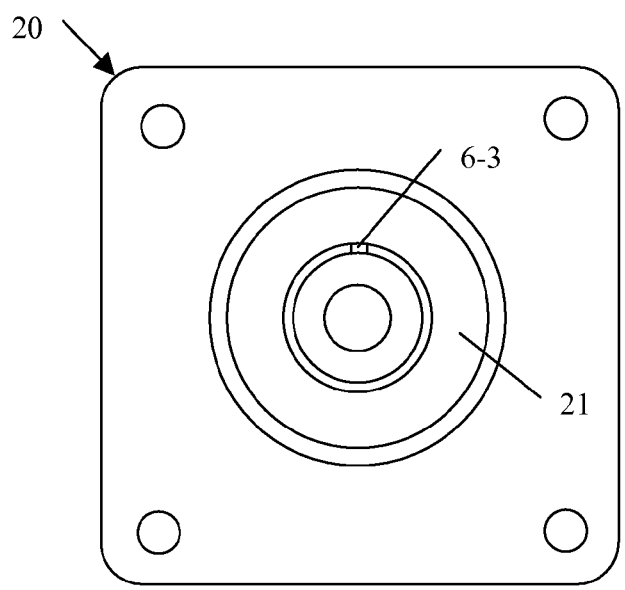

In a further embodiment, the union adapter features angle polished surfaces to reduce back reflection. As illustrated in the cross section of FIG. 4A, the flange of connector housing 11 allows the union adapter to be mounted to a wall plate or panel mount. Inside housing 11 is the precision split sleeve 8 within two-piece split sleeve retaining elements 7-1 and 7-2. Element 7-2 is fixed within body 11 by a friction fit, for example. The fiber stub is retained within split sleeve 8. The ends of fiber stub 9 are prepared with parallel, angle polished faces 4. The use of angled surfaces reduced back reflections to <−65 dB. As illustrated in FIG. 4B, the key 6-3 in frontside connector receptacle 21 ensures that the angled ferrules are inserted with the proper azimuthal orientation so that all angled fiber surfaces are parallel to one another. This performance is necessary for transmitting analog video signals or for access networks in which a signal is split and distributed to several users.

Figure 5A:
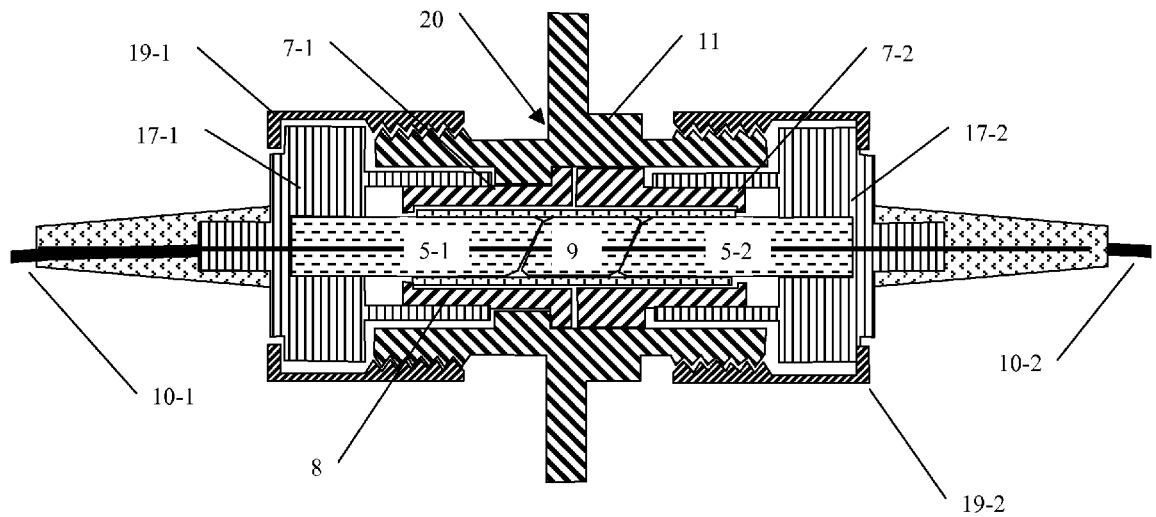
FIG. 5 illustrates a cross sectional view (A) of an FC-APC type union attached to a pair of fiber optic cables and a magnified view (B) of the adiabatic transition of waveguide cores through the device.

FIG. 5A illustrates a cross sectional view of this FC-APC fiber optic union adapter 20 including connectorized fiber 10-1 inserted into receptacle 21' and connectorized fiber 10-2 inserted into receptacle 21. Fiber 10-1 is terminated at ferrule 5-1 within connector body 17-1 with a screw on cap 19-1 that maintains the connector attached to union housing 11-1. Fiber 10-2 is terminated at ferrule 5-2 within connector body 17-2 with a screw-on cap 19-2 that attaches the connector to union housing 11-2. The ferrules 5-1 and 5-2 achieve continuous, uninterrupted optical contact with fiber stub 9 at the central waveguide core region of the ferrules.

Figure 5B:
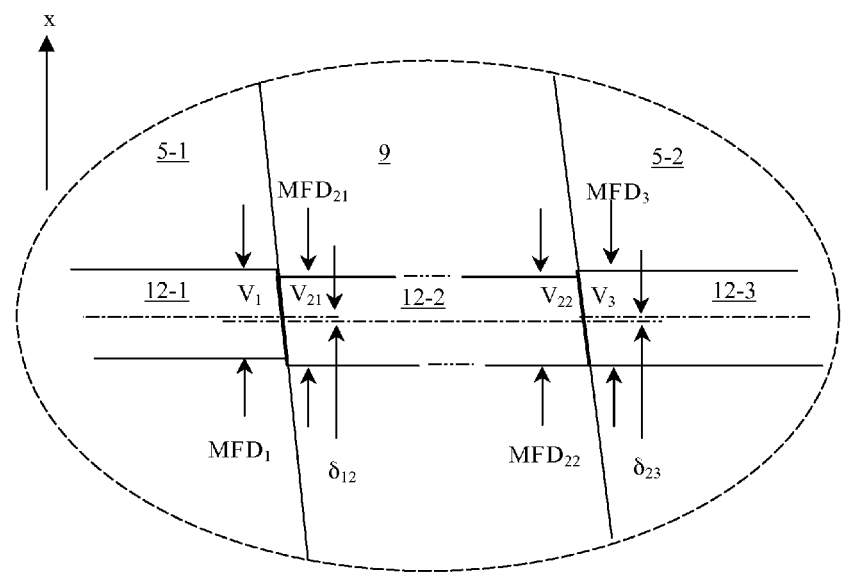

The magnified view of FIG. 5B details the geometry of the waveguide cores across the adiabatic transition region of the fiber stub. The waveguide cores 12-1, 12-3 at the endfaces of cables 10-1 and 10-2, respectively, and the core 12-2 within stub 9, are characterized by a mode field diameter (MFD), which is a measure of the diameter of the optical beam propagating through the fiber, and V number, which is a measure of the number of modes which can be supported by the waveguide core. Furthermore, the relative positional offset errors of the optical fiber cores at transition interface 1 and interface 2 are denoted by 612 and 623, respectively. Low loss and back reflection follows if the following adiabaticity requirements are meet:

$$\delta_{12}/(MFD_1+MFD_{21})<0.1, \quad \text{Eq. 1}$$

$$\delta_{23}/(MFD_{22}+MFD_3)<0.1, \quad \text{Eq. 2}$$

$$0.9<V_1/V_{21}<1.1, \quad \text{Eq. 3}$$

$$0.9<V_{22}/V_3<1.1. \quad \text{Eq. 4}$$

Equations 1 and 2 ensure that there is minimal non-adiabatic positional offset of the two optical modes at the interconnection interfaces and equations 3, 4 ensure that the waveguide structural characteristics undergo a negligibly small change at the interfaces. By maintaining sub-micron concentricity of the core of fiber 10-4 with the outer diameter of fiber 10-4, and sub-micron concentricity of the ferrule 9 inner diameter and outer diameter, adiabaticity is maintained so that the excess insertion loss due to this isolated union adapter is typically less than 0.25 dB. For highly concentric fiber stubs (<1 micron for single mode stubs and <3 micron for multimode stubs), the insertion loss may actually be lower than standard union adapters. Insertion loss increases approximately quadratically with waveguide core concentricity error because the abrupt misalignment is non-adiabatic. Therefore, a stub with concentricity error less than that of the mating ferrules of the cable connectors can actually produce lower loss than directly mating the two ferrules. For example, if one ferrule has a $\delta_{12}=+1$ micron error in x direction and the other has a $\delta_{23}=-1$ micron error in x, while the fiber stub has an error of 0 microns, the excess loss of a standard union adapter would be two times larger than the excess loss of this adiabatic, protective union adapter. Therefore, the protective union adapter has the potential to reduce the net loss by a factor of 2 if its concentricity error tolerances are superior to that of the mating ferrules. For example, fiber stubs using ferrules with single mode tolerances (<1 micron) can be used to give superior insertion loss for multimode union adapters.

The fiber stub ferrule is typically fabricated of zirconia, ceramic or fused silica, with an embedded fused silica optical fiber of 125 microns or 80 microns outer diameter. The length of the fiber stub is typically 2.5 mm to 4.5 mm long for the 2.5 mm diameter stub. The core of optical fiber 10-4 is typically 10 microns in diameter and propagates single spatial mode radiation at wavelengths of 1550 or 1310 nm with extremely low optical loss, or core diameter is typically 50, 62.5 microns for propagation of multi-mode radiation in the range of 800 nm to 1600 nm. The split sleeve 8 is typically fabricated of zirconia, ceramic, plastic or phosphor bronze that conforms to the 2.5 mm or 1.25 mm outer diameter of the fiber stub.

In an alternate example, the waveguide core of the fiber stub 9 may produce a non-adiabatic, but low absorption waveguide core transition to provide wavelength dependent transmission and reflection responses. The waveguide core within the fiber stub may have a larger diameter than the waveguide cores of the mating back-side and front-side optical fibers. By virtue of its larger diameter, the fiber stub core has a V number greater than 2.4 and therefore supports the low loss propagation of multiple optical models. Each mode is characterized by a different modal index of refraction and different group velocity. A single mode core of the front-side cable will excite higher order modes within the multimode core due to the non-adiabatic interface. These modes will interfere or beat with one another within the multimode core as the relative phases between each of the modes vary with longitudinal distance through the stub. Only a fraction of optical power in each of these modes will couple back into the single mode core of the back-side fiber. The resulting non-uniform mode coupling translates into a non-uniform wavelength-dependent transmission response. The length of fiber stub and its effective modal indices of refraction are selected to give a predefined wavelength dependent transmission and reflection. This wavelength dependent transmission can be utilized for filtering and/or sensing applications. For example, if the temperature of the fiber stub changes, the phase difference between the various modes supported by the stub and its transmission at any particular wavelength will cycle between constructive and destructive interference as a function of this phase difference. Such an element may provides fiber optic sensing or filtering functionality. In a particular example, the front-side and back-side cables have a 9 micron diameter core, while the fiber stub includes a 50 micron diameter core with 4.0 mm length.

Male-to-Female Protective Union Adapters

Figure 6:
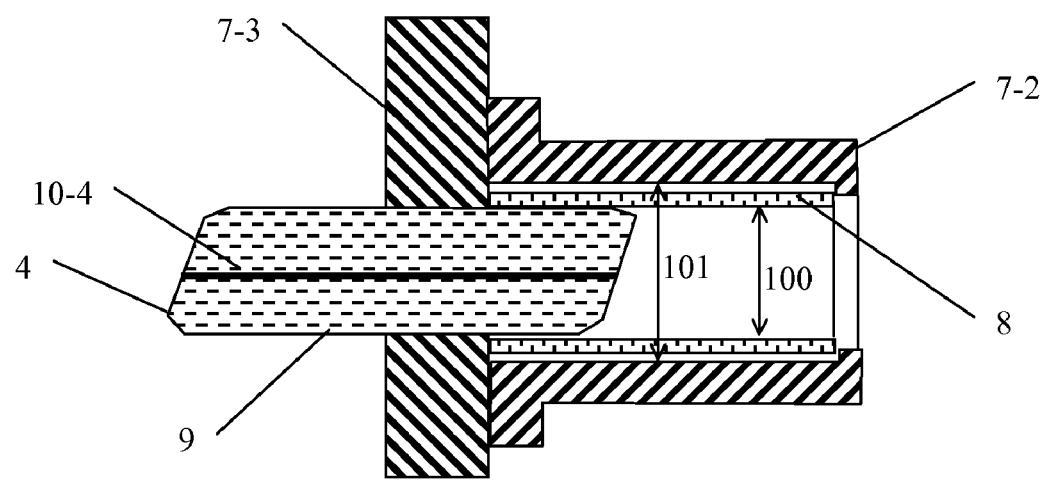
FIG. 6 illustrates a cross sectional view of a fiber optic male-to-female adapter for joining male to female fiber optic connectors.

In an alternate embodiment, a union adapter can be provided to interconnect a male-to-female fiber optic termination. FIG. 6 illustrates a cross sectional view of the fiber stub-ferrule subassembly for a fiber optic male-to-female union adapter. The housing is not shown in this view. This configuration enables the union adapter to be inserted between the male end of a fiber optic cable and a female termination incorporated in the housing of an optical transceiver, for example. The union adapter introduces low excess loss by utilizing low optical attenuation single mode or multimode fiber within the isolating fiber stub and an adiabatic transition of the waveguide core. In this particular example, the union adapter includes a split sleeve 8 within retaining sleeve 7-2. The retaining element 7-3 is attached to fiber stub 9. Fiber stub 9 has polished end faces 4 and embedded optical fiber 10-4, one end of which is internal to split sleeve 8. End faces 4 may optionally be antireflection coated to minimize any transmission ripple. Optical fiber 10-4 may exhibit single mode or multi-mode propagation characteristics. The housing body (not shown in FIG. 6) may be of the FC, ST, SC, LC, MTRJ or other industry standard connector styles, in a simplex or duplex configuration. The polished end faces 4 can be the APC, PC, UPC or other industry standard types.

EXAMPLE

Optical Signal Processor with Replaceable Receptacles

Figure 7A:
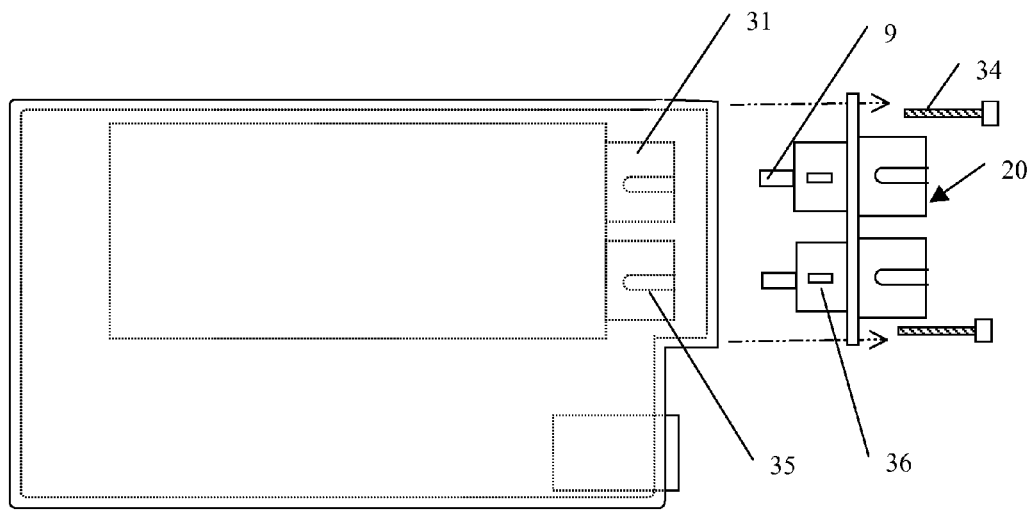
FIGS. 7A and 7B illustrate a fiber optic transmission module including integrated isolated adapters.
Figure 7B:
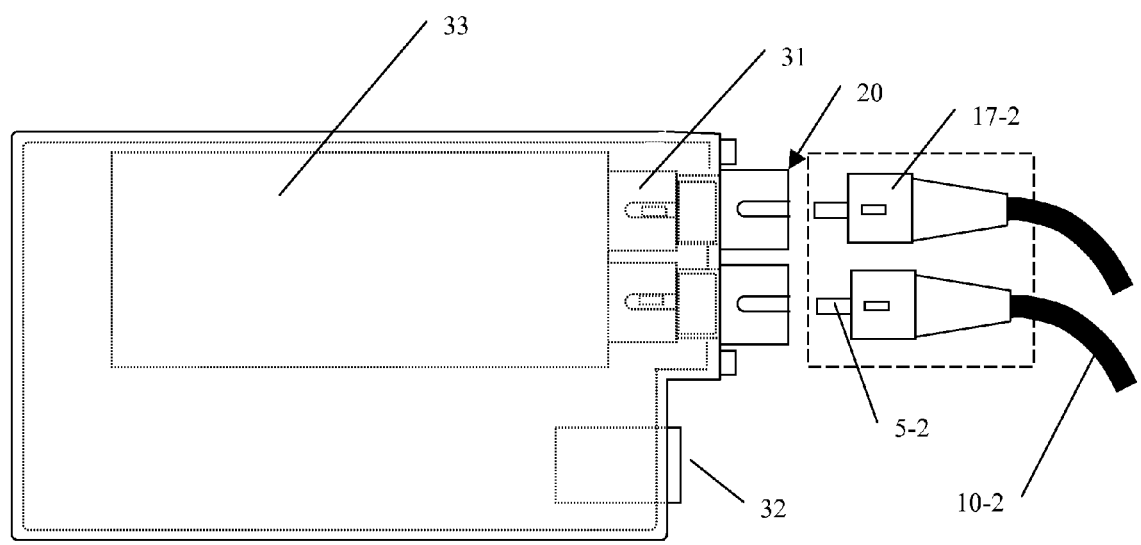

In a particular example, the male-to-female isolating union adapters are used to isolate the fiber optic ports of an optical signal processor. More specifically, the optical signal processor may be in the form of a duplex fiber optic transceiver module, an example of which is illustrated in FIGS. 7A and 7B. This module may be transmit optical Ethernet-formatted data at rates up to 10 Gbit/sec and include electrical signal conversion or communication. The transceiver module 33 is packaged within a housing 32 and includes integrated duplex, female-type fiber optic receptacles 31. In FIG. 7 these receptacles 31 are of the SC-UPC type with either multi-mode or single mode fiber interfaces, for example, and with alignment channels 35. Alternate receptacle types include LC, ST and MTRJ. Damage to the internal fiber interfaces within receptacle 31 is difficult or impractical to repair. To protect this interface from damage, this transceiver unit includes an integrated isolating union adapter 20 which inserts into a mating cavity within transceiver housing 32. The internal structure of union adapter 20 includes a fiber stub 9 and alignment sleeve 8. The union adapter 20 prevents the ferrules 5 of external terminated fiber optic cables with connector 17-2 from contacting the receptacles 31 in the transceiver unit 33. In this way, should a cable 10-2 with damaged or contaminated ferrule 5 be inserted into 20, damage is restricted to the inexpensive, replaceable union adapter 20 rather than the transceiver 33. The union adapter is attached to the housing by semi-permanent means, such as screws 34 which hold union adapter 20 to enclosure 32. This attachment prevents the user from exposing the receptacles 31 during routine use. Repair of transceiver 33 requires a simple replacement of union adapter 20. This approach protects the fiber optic interface ports of other high value optical signal processors from damage, such as optical switches and multiplexers/demultiplexers.

Adapter for Dissimilar Fiber Types

Bend insensitive fiber may be preferable within the customer's premises because fiber optic patchcords incorporating this fiber are more robust under bending and routine handling. However, in many cases the fiber drop cable 10-1 entering the customer's premises is standard single mode optical fiber. Directly interfacing connectorized single mode fiber and connectorized, bend insensitive fiber can result in relatively high insertion loss (>0.5 dB) and signal degradation. Therefore, in accordance with this invention, low loss interconnection between dissimilar fiber types is provided by utilizing a fiber stub element within a union adapter including an adiabatic waveguide core transition. A low optical loss transition between fibers with dissimilar core diameters, as is the case for standard and bend insensitive fiber, or multimode 50/125 micron and 62.5/125 micron multimode fibers, can be achieved by utilizing an adiabatic taper of the core diameter and MFD to smoothly and continuously transition from one fiber diameter to the other within a longitudinal distance greater than the beat note length, determined from the difference in propagation constants between the two fibers. This distance is typically between 10 and 1000 microns, depending on the fiber core diameters and wavelength of operation. This range of lengths enables the adiabatic core transition to be packaged within the stub in a compact fashion. The stub length is typically 4 mm.

The adiabatic taper within the isolating fiber stub may be fabricated by partially diffusing out the core at one end of a bend insensitive fiber to match the mode field diameter of a particular single mode fiber and fusion splicing this end to the particular single mode fiber. The adiabatic taper is formed longitudinally adjacent to the fusion splice and is part of a continuous length of fiber which can be epoxied into a ferrule to produce a fiber stub with different core diameters at the opposite end faces. This fiber stub is fixed at the center of the union adapter. In this case, a standard single mode fiber cable termination can be attached to a bend insensitive, single mode fiber cable with low insertion loss (<0.10 dB).

Figure 8:
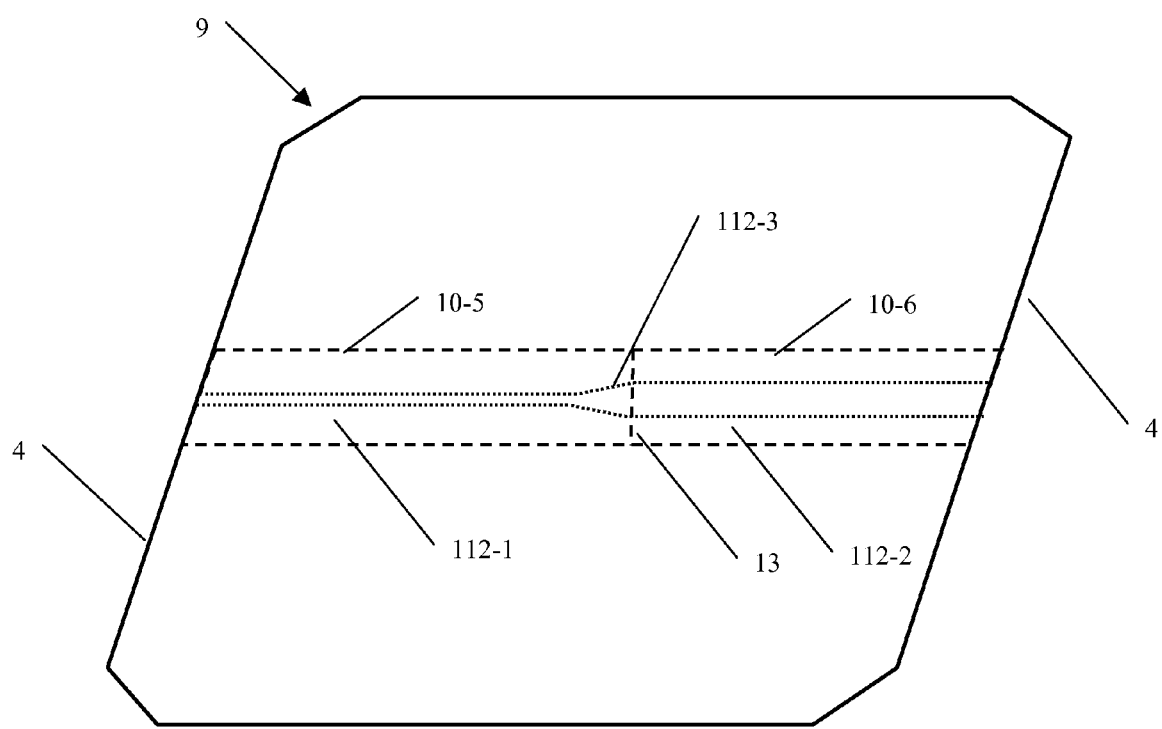
FIG. 8 illustrates a cross sectional view of a fiber stub with an adiabatic waveguide core transition between connectorized bend insensitive fiber and standard single mode fiber.

In a particular example, FIG. 8 details the fiber stub and illustrates the internal fusion-spliced optical fibers joined by an adiabatic taper. Bend insensitive fiber 10-5 has a core 112-1 of generally smaller diameter than standard single mode fiber 10-6 with core 112-2. The diameter of core 112-1 is typically 6 to 8 microns and the diameter of core 112-2 is typically 9-10 microns. In the taper region, the core diameter monotonically varies while maintaining a minimal slope of the waveguide walls.

Figure 9:
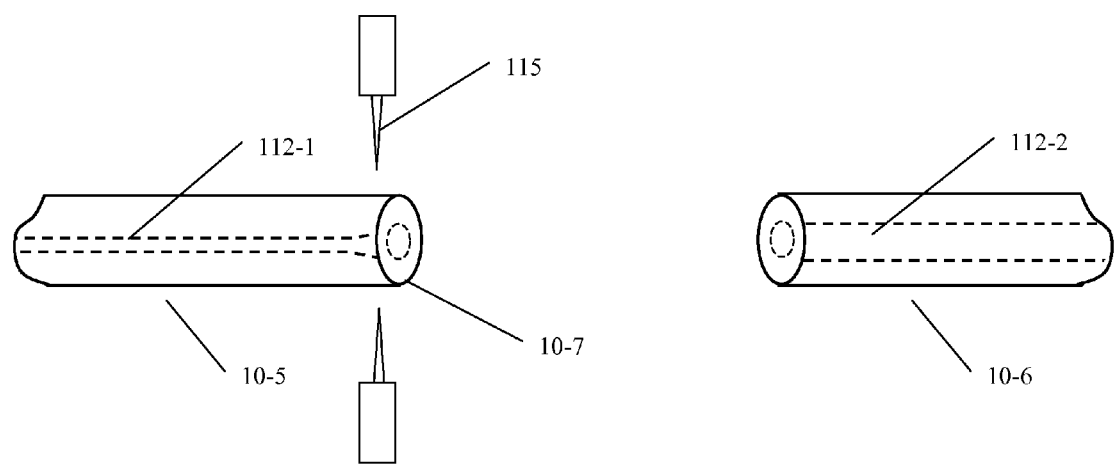
FIG. 9 illustrates the process of producing the adiabatic taper by electrical arcing.
Figure 10:
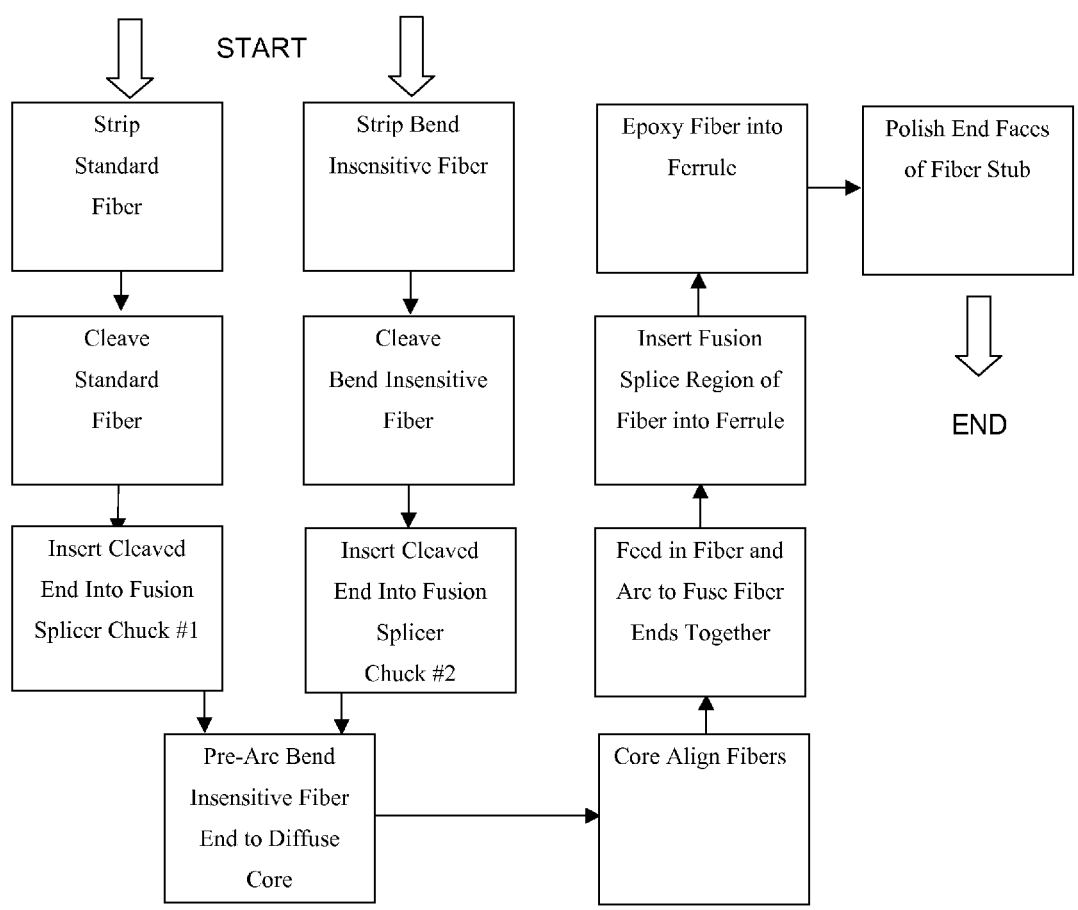
FIG. 10 depicts a flow diagram outlining the steps of producing a fiber stub including an adiabatic tapered core transition.

In a particular example of the adiabatic taper manufacturing process (FIG. 9), the adiabatic waveguide taper within the bend insensitive fiber is formed by using a fusion splicer's electrical arc 15, for example, to heat the end of the bend insensitive fiber 10-5 and diffuse out the core 112-1 to enlarge the mode field diameter locally and match the core 112-2 of second fiber 10-6. Pre- or post-arcing functionality is available on standard fusion splicers such as the Alcoa-Fujikura Model 50FS. Typical fabrication steps are disclosed in the flow chart of FIG. 10. Alternate approaches to diffusing the core include localized heating with a $CO_2$ laser emitting at a wavelength of 10.6 microns or with mini-torches such as the hydrogen gas -type used to fabricate fused couplers. Fiber cleaving can be provided by use of standard precision cleavers manufactured by Alcoa-Fujikura or Sumitomo. The two fibers are contacted and heated to form a fusion splice with interface 13 and adiabatic taper 112-3. The fibers 10-5 and 10-6 are subsequently inserted and bonded into a ferrule to form a fiber stub 9 assembly. The end faces 4 of the fiber stub 9 are polished to mate with standard angle polished or flat polished connectors.

Union Adapter for Dissimilar Fiber Types

Figure 11A:
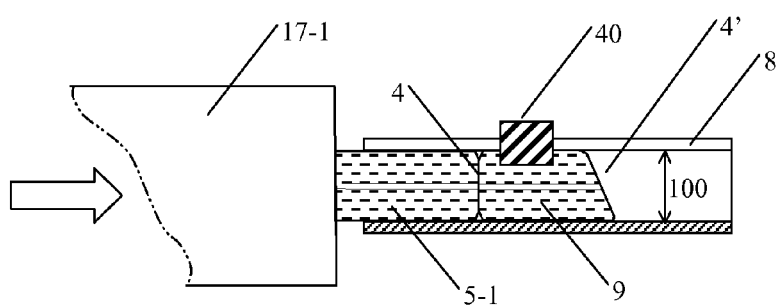
FIGS. 11A and B illustrate a protective union adapter for mating angle polished connector to non-angle polished connector through an adiabatic waveguide transition.
Figure 11B:
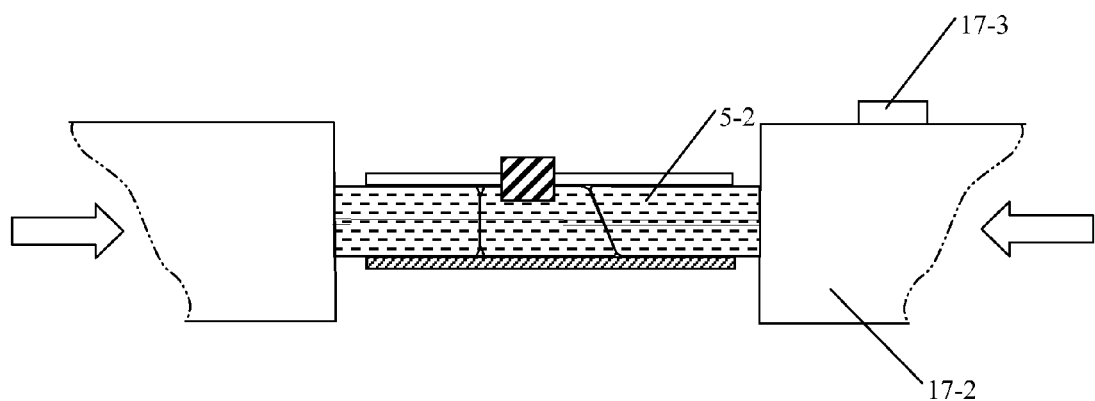
Figure 12:
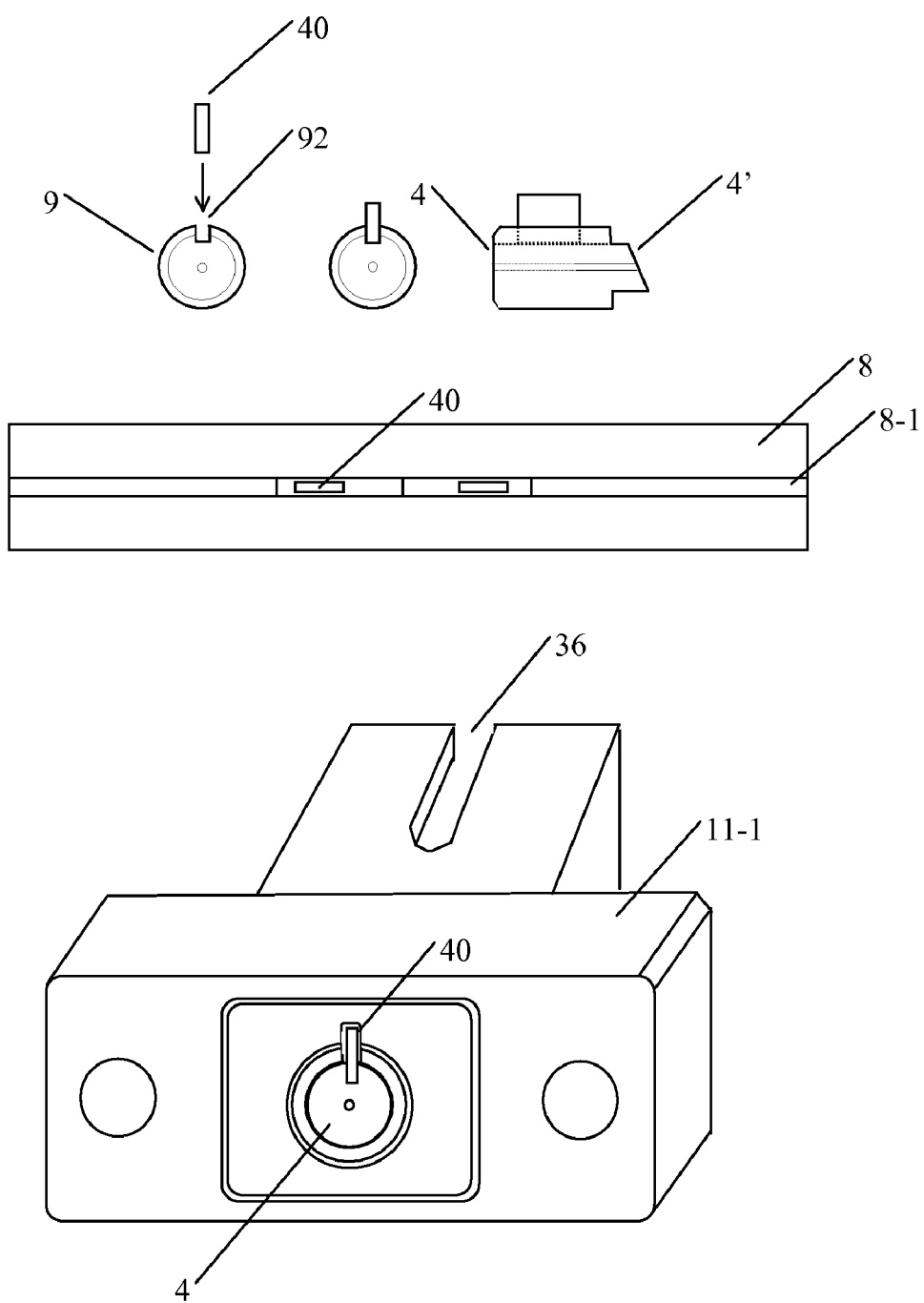
FIG. 12 details a fiber stub for angle polished connectors and alignment features to properly orient the angled stub within union adapter, and FIGS. 13 A and B illustrate a protective union adapter which switches between adiabatic and non-adiabatic transmission when one cable is removed from the adapter.

In an alternate example, the union adapter may serve as an adaptive interface between dissimilar terminations, such as UPC and APC. As illustrated in FIGS. 11A and 11B, the fiber stub is provided with UPC polish at one end 4 and APC polish at the other end 4'. While the UPC polished surface 4 is normal to the beam propagation direction, the incidence angle to the APC polished surface 4' is typically eight degrees. This union adapter enables a UPC terminated cable connector 17-1 to be interfaced thru the intermediate stub to an APC terminated cable connector 17-2 while retaining the protective aspects disclosed herein. In this configuration, the angled surface of the fiber stub must be aligned relative to the connector alignment key of the mating cable. As detailed in FIG. 12, this is achieved by azimuthally aligning the radial extension 40 of fiber stub 9 relative to the gap 8-1 in the outer split sleeve 8, and aligning the split sleeve gap relative to the union adapter housing 6-1. For example, the cavity in the union adapter housing 11-1 may include a key 36 to engage the split sleeve gap 8-1 and maintain proper azimuthal orientation of the split sleeve-fiber stub assembly. The ferrule may include a longitudinal slot 92 into which a ceramic, metal or plastic extension is bonded. The thickness of this extension is less than the split sleeve gap 8-1 so the stub can slide within the split sleeve without rotating.

APC terminations serve to reduce the impact of back reflections on optical network performance. For example, the back reflection of optical signals from un-terminated connectors degrade overall optical network performance in broadcast type networks in which an optical signal is split and distributed to several different users via unique fiber paths or in analog video links. For single mode fiber transmission, the level of attenuation of back reflections, or return loss, should typically exceed 50 dB to prevent undesirable crosstalk. Unterminated PC and UPC cables, whether disconnected or attached to union adapters, provide a return loss of only 14 dB. Therefore, in accordance with this invention, this union adapter example has the further advantage of providing low back reflection termination from a UPC terminated cable inserted into the back side cable receptacle, even when no mating connector is inserted into the front side cable receptacle.

Union Adapter Providing Low Back Reflection/Low Transmission While Unterminated

Figure 13A:
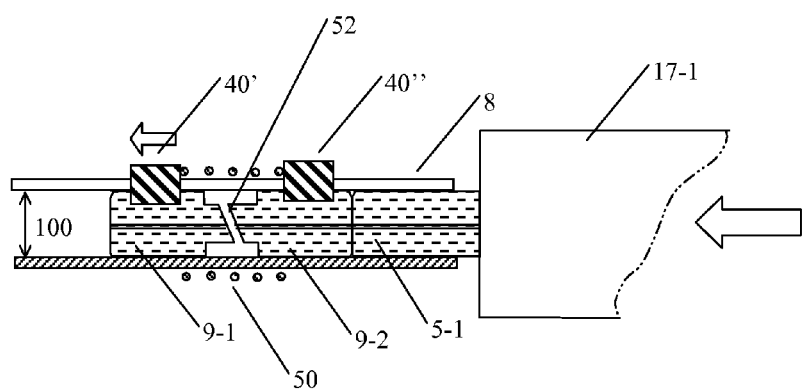
Figure 13B:
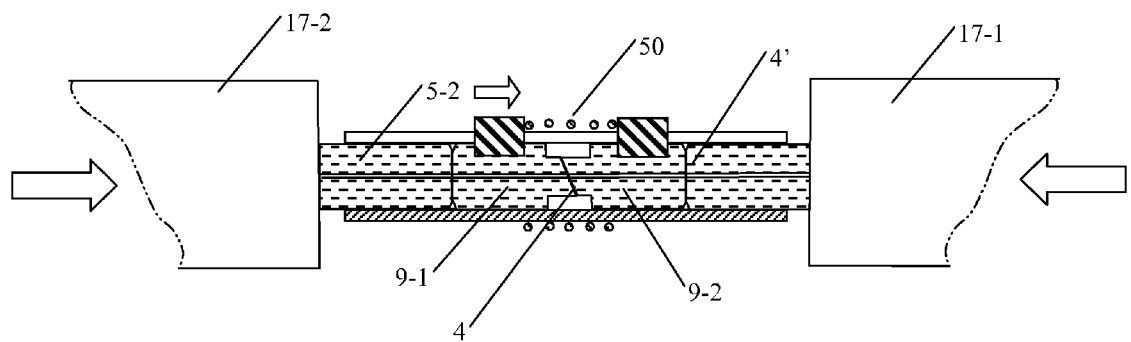

In a further example, the protective union adapter may include two in-line fiber stubs, a front-side stub and a back-side stub, in series and concentrically aligned within a single outer split sleeve (FIGS. 13A and 13B). The surfaces of the two stubs 9-1 and 9-2, which contact each other at the center of the split sleeve 8, are angle polished and azimuthally aligned to provide low loss physical contact. The edges of the stub end faces may be fabricated with a circumferential step rather than angled bevel as illustrated here. A compression spring or elastomer element 50 lies inside or outside the spit sleeve to engage the raised stub extensions 40' and 40". This spring element longitudinally separates the two angle polished surfaces 4' when one of the mating cables 17-2 is removed. In the absence of the longitudinal compressive force provided by the spring-loaded ferrules of the mating cable 17-2, the fiber stubs separate within the precision split sleeve to produce an air gap 52 there between. Reinsertion of the mating cable 17-2 recompresses the spring element 50 so the gap between the two stub elements 9-1, 9-2 vanishes. This design has the advantage that when only one cable 17-1 is attached to the union adapter, an angled air gap 52 is present. This geometry provides low back reflection, because the inner surfaces of the fiber stub are angled, and also substantially prevents light from escaping from the fiber stub facing the front-side receptacle. The width of air gap 52 is large enough that light emanating from the back-side stub 9-2 is blocked by the opaque ferrule used in the front-side stub 9-1. An additional feature of the protective union adapter described above is therefore an automatic shuttering functionality with low unterminated back reflection.

When the front side cable connector 17-2 is installed into the union adapter, the longitudinal, extension spring force on the connector ferrule produced when inserting the cable connector body into the union adapter receptacle is adequate to compress the spring or elastomer element 50 between the front-side 9-1 and back-side 9-2 stubs and eliminate the central air gap. The high concentricity of the stub pair and split sleeve enables one or both stubs to longitudinally piston within the split sleeve while maintaining precise radial or transverse alignment even during repeated cycling of connection and disconnection. The central air gap region is also shielded from environmental contamination by the surrounding split sleeve 8 and union adapter housing. As a result, low loss and repeatable light transmission between the front-side and back-side cables is achieved.

The force required to separate the two stubs 9-1, 9-2 within the split sleeve 8 under the compressive/frictional force of the split sleeve is determined by the diameter increase of the split sleeve when the stubs are installed, as well as the material used to construct the sleeve. For zirconia sleeves, the typical force to longitudinally displace the stub is 200 gram-force (gf) to 600 gf for SC, FC and ST type terminations and 100 gf to 300 gf for MU and LC type terminations. Therefore, the spring or elastomer element should produce adequate outward longitudinal force to separate the stubs when one or both fiber optic cables are removed from the union adapter. The spring element may be constructed of metal, plastic or rubber, in the form of a compression spring, Bellville washer, or tube, for example.

In summary, fiber optic networking equipment and optical signal processors such as transceivers, switches, amplifiers, multiplexers/demultiplexers, modems and patch panels typically include large numbers of fiber optic union adapters to mate connectorized fiber optic cables. These unions join fibers in locations where permanent fusion splices are inappropriate because of the need to periodically reconfigure or replace fiber optic cables. A great limitation in prior art approaches is the fact that if one cable's ferrule is dirty or damaged, it will likely transfer damage to the mating ferrule because the union physically contacts the polished enfaces of both ferrules to one another. In many cases, the damaged mating ferrule is part of a back-side cable deeply embedded within the fiber optic plant. Replacing such a cable is a costly process. To eliminate this damage, we have disclosed an inexpensive component providing a low loss and potentially low back reflection by introducing an adiabatic waveguide transition between the cores of two mating optical fibers through a fiber stub element within the union adapter.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An adapter unit for enabling isolated physical coupling with less than 1 dB optical insertion loss to complete a communication link between end faces of opposing first and second ferrule tipped terminals each including central optical fiber cores, the end faces being spaced apart by a predetermined distance including a transition section along a longitudinal central optical communication axis and the adapter unit comprising:
   a housing body encompassing the transition section at an intermediate region along the longitudinal central optical communication axis;
   a sleeve holder disposed in the housing body in a position to span the longitudinal transition section, the sleeve holder including a central aperture about the central axis and being divided transversely in an intermediate region along its length relative to the central optical communication axis;

a sleeve disposed within the central aperture in the sleeve holder and extending therethrough, the sleeve comprising a semi-rigid cylindrical element substantially spanning the length of the sleeve holder, and including a longitudinal separation, and being concentric with the central optical communication axis and defining opposite end receptacles sized for receiving the ferrule tipped terminals of optical fiber connectors;

a fiber optic stub disposed within the sleeve between the opposite end receptacles, the stub including polished end faces defining the opposite ends thereof for engagement with the opposed end faces of ferrule tipped terminals inserted and retained in the opposite end receptacles of the sleeve, the stub further including a length of longitudinally continuous central optical fiber core within an encompassing material, the core being in alignment with the optical communication axis and configured to define the transition section;

the end faces of the stub being configured to closely abut the opposing end faces of ferrule tipped terminals positioned in the sleeve and providing substantial optical continuity along the central optical communication axis, and wherein the inner diameter of the sleeve is dimensioned to maintain transverse misalignment of the central optical fiber cores relative to the central optical communication axis, within 1 micron, and wherein the transition section between the central optical fiber cores in the ferrule tipped terminals and the central optical fiber core of the stub is adiabatic in character.

2. An adapter unit for enabling isolated physical coupling with less than 1 dB optical insertion loss to complete a communication link between end faces of opposing first and second ferrule tipped terminals each including central optical fibers, the end faces being spaced apart by a predetermined distance including a transition section along a longitudinal central optical communication axis and the adapter unit comprising:

a housing body encompassing the transition section at an intermediate region along the longitudinal central optical communication axis;

a sleeve holder disposed in the housing body in a position to span the longitudinal transition section, the sleeve holder including a central aperture about the central axis;

a sleeve disposed within the central aperture in the sleeve holder and extending therethrough, the sleeve being concentric with the central optical communication axis and defining opposite end receptacles sized for receiving the ferrule tipped terminals of optical fiber connectors;

a fiber optic stub disposed within the sleeve between the opposite end receptacles, the stub including polished end faces defining the opposite ends thereof for engagement with the opposed end faces of ferrule tipped terminals inserted and retained in the opposite end receptacles of the sleeve, the stub further including a length of longitudinally continuous central optical fiber core within an encompassing material, the core being in alignment with the optical communication axis and configured to define an optical transition section;

the end faces of the stub being configured to closely abut the opposing end faces of ferrule tipped terminals positioned in the sleeve and providing substantial optical continuity along the central optical communication axis, and wherein the stub includes the substantially central optical fiber having two different core diameters at the end faces thereof and includes at an intermediate location along its length a continuous, adiabatic transition section of varying cross-sectional core diameter uniting the different core diameters.

3. An adapter unit for enabling isolated physical coupling with less than 1 dB optical insertion loss to complete a communication link between end faces of opposing first and second ferrule tipped terminals each including central optical fibers, the end faces being spaced apart by a predetermined distance including a transition section along a longitudinal central optical communication axis and the adapter unit comprising:

a housing body encompassing the transition section at an intermediate region along the longitudinal central optical communication axis;

a sleeve holder disposed in the housing body in a position to span the longitudinal transition section, the sleeve holder including a central aperture about the central axis;

a sleeve disposed within the central aperture in the sleeve holder and extending therethrough, the sleeve being concentric with the central optical communication axis and defining opposite end receptacles sized for receiving the ferrule tipped terminals of optical fiber connectors;

a fiber optic stub assembly disposed within the sleeve between the opposite end receptacles, the stub assembly including polished end faces defining the opposite ends thereof for engagement with the opposed end faces of ferrule tipped terminals inserted and retained in the opposite end receptacles of the sleeve, the stub assembly further including a length of longitudinally continuous central optical fiber core within an encompassing material, the core being in alignment with the optical communication axis and configured to define an optical transition section;

the end faces of the stub being configured to closely abut the opposing end faces of ferrule tipped terminals positioned in the sleeve and providing substantial optical continuity along the central optical communication axis, and wherein the first and second ferrule tipped terminals include first and second central optical fibers, respectively, and wherein the end faces of the ferrule tipped terminals are polished and at predetermined angles to the central optical communication axis, and wherein the fiber stub assembly includes end faces substantially identical to the polished end faces of the first and second opposing ferrule tipped terminals and providing therewith in combination a low insertion loss of less than 1 dB, the fiber stub assembly being configured to define an adiabatic coupling with the opposing ferrule tipped terminals and the fiber stub assembly being separable from the first and second ferrule tipped terminals to provide restored adiabatic optical coupling when a different ferrule tipped terminal is inserted into the sleeve.

4. An adapter unit for enabling isolated physical coupling with less than 1 dB optical insertion loss to complete a communication link between end faces of opposing first and second ferrule tipped terminals each including central optical fibers, the end faces being spaced apart by a predetermined distance including a transition section along a longitudinal central optical communication axis and the adapter unit comprising:

a housing body encompassing the transition section at an intermediate region along the longitudinal central optical communication axis;

a sleeve holder disposed in the housing body in a position to span the longitudinal transition section, the sleeve holder including a central aperture about the central axis;

a sleeve disposed within the central aperture in the sleeve holder and extending therethrough, the sleeve being concentric with the central optical communication axis and defining opposite end receptacles sized for receiving the ferrule tipped terminals of optical fiber connectors;

a fiber optic stub disposed within the sleeve between the opposite end receptacles, the stub including polished end faces defining the opposite ends thereof for engagement with the opposed end faces of ferrule tipped terminals inserted and retained in the opposite end receptacles of the sleeve, the stub further including a length of longitudinally continuous central optical fiber core within an encompassing material, the core being in alignment with the optical communication axis and configured to define the transition section;

the end faces of the stub being configured to closely abut the opposing end faces of ferrule tipped terminals positioned in the sleeve and providing substantial optical continuity along the central optical communication axis, and wherein the central aperture in the sleeve holder defines a first interior channel having a predetermined internal diameter and the first and second ferrule tipped terminals have polished end faces at predetermined angles to a plane transverse to the central optical communication axis thereof, wherein the sleeve defines a second interior channel concentric with the first interior channel, with an internal diameter sized in diameter and length to accept the fiber optic stub and the first and second ferrule tipped terminals, the fiber optic stub having first and second end faces isolating the optical fibers of the ferrule tipped terminals from direct physical contact with one another and being separable from the first and second ferrule tipped terminals to permit optical continuity when a different ferrule tipped terminal is inserted into the sleeve as a replacement, and wherein the first and second ferrule tipped terminals comprise optical fibers that are single mode or multi-mode with nominal core diameters up to 100 microns and cladding diameters of approximately 125 microns, with the internal diameter of the second interior channel being in the range of 125-127 microns and the internal diameter of the first interior channel being in the range of about 2.5 mm to 1.25 mm.

5. An adapter unit for enabling isolated physical coupling with less than 1 dB optical insertion loss to complete a communication link between end faces of opposing first and second ferrule tipped terminals each including central optical fibers, the end faces being spaced apart by a predetermined distance including a transition section along a longitudinal central optical communication axis and the adapter unit comprising:

a housing body encompassing the transition section at an intermediate region along the longitudinal central optical communication axis;

a sleeve holder disposed in the housing body in a position to span the longitudinal transition section, the sleeve holder including a central aperture about the central axis;

a sleeve disposed within the central aperture in the sleeve holder and extending therethrough, the sleeve being concentric with the central optical communication axis and defining opposite end receptacles sized for receiving the ferrule tipped terminals of optical fiber connectors, and a fiber optic stub disposed within the sleeve between the opposite end receptacles, the stub including polished end faces defining the opposite ends thereof for engagement with the opposed end faces of ferrule tipped terminals inserted and retained in the opposite end receptacles of the sleeve, the stub further including a length of longitudinally continuous central optical fiber core within an encompassing material, the core being in alignment with the optical communication axis and configured to define the transition section;

the end faces of the stub being configured to closely abut the opposing end faces of ferrule tipped terminals positioned in the sleeve and providing substantial optical continuity along the central optical communication axis, and wherein the central optical fibers are single mode or multi-mode with different nominal core diameters and the central optical fiber core in the fiber optic stub includes a fiber fusion splice which gradually tapers at a longitudinally intermediate location between the different nominal core diameters.

* * * * *